US012566062B2

(12) United States Patent
Yukimatsu et al.

(10) Patent No.: US 12,566,062 B2
(45) Date of Patent: Mar. 3, 2026

(54) SURFACE SHAPE MEASURING APPARATUS AND SURFACE SHAPE MEASURING METHOD

(71) Applicant: Resonac Corporation, Tokyo (JP)

(72) Inventors: Koji Yukimatsu, Tokyo (JP); Teruyoshi Shimizu, Tochigi (JP); Sunao Kanno, Miyagi (JP); Katsuhide Bizen, Miyagi (JP)

(73) Assignee: Resonac Hard Disk Corporation, Chiba (JP)

( * ) Notice: Subject to any disclaimer, the term of this patent is extended or adjusted under 35 U.S.C. 154(b) by 109 days.

(21) Appl. No.: 18/663,722

(22) Filed: May 14, 2024

(65) Prior Publication Data

US 2024/0393105 A1 Nov. 28, 2024

(30) Foreign Application Priority Data

May 23, 2023 (JP) ................................. 2023-084778

(51) Int. Cl.
*G01B 11/25* (2006.01)
*G01B 9/08* (2006.01)
(52) U.S. Cl.
CPC ............ *G01B 11/2513* (2013.01); *G01B 9/08* (2013.01)
(58) Field of Classification Search
CPC ... G01B 11/2513; G01B 11/25; G01B 11/254; G01B 11/24; G01B 11/2531; G01B 9/08; G01N 2201/0634
See application file for complete search history.

(56) References Cited

U.S. PATENT DOCUMENTS

| | | | | |
|---|---|---|---|---|
| 5,172,005 A | * | 12/1992 | Cochran | ............ G01N 21/8901 |
| | | | | 348/E7.086 |
| 5,461,417 A | * | 10/1995 | White | .................... H04N 23/74 |
| | | | | 348/125 |
| 5,684,530 A | * | 11/1997 | White | .................. H04N 1/0286 |
| | | | | 348/125 |
| 5,974,150 A | * | 10/1999 | Kaish | ................... G06K 19/086 |
| | | | | 713/168 |
| 6,285,787 B1 | * | 9/2001 | Kawachi | ............ G01N 21/8806 |
| | | | | 250/201.3 |
| 9,418,291 B2 | * | 8/2016 | Sonoda | .................. B25J 9/1612 |
| 2004/0184031 A1 | * | 9/2004 | Vook | ...................... G06T 7/586 |
| | | | | 356/237.1 |

(Continued)

FOREIGN PATENT DOCUMENTS

| | | |
|---|---|---|
| JP | 2004-354283 | 12/2004 |
| JP | 2010-197391 | 9/2010 |

*Primary Examiner* — Sang H Nguyen
(74) *Attorney, Agent, or Firm* — IPUSA, PLLC

(57) ABSTRACT

A surface shape measuring apparatus for measuring a specular surface includes an illuminator configured to illuminate the specular surface with a first light pattern, an imaging device configured to capture an image of a second light pattern which is light transmitted through the illuminator after the first light pattern from the illuminator is reflected by the specular surface, and a processing apparatus configured to acquire a positional deviation amount of the second light pattern from a predetermined position in the image captured by the imaging device, and to output information related to a surface shape of the specular surface acquired from the positional deviation amount.

10 Claims, 9 Drawing Sheets

(56) References Cited

U.S. PATENT DOCUMENTS

2005/0007593 A1* 1/2005 Lebens .............. G01N 21/8806
                                                356/394
2014/0372075 A1* 12/2014 Kojima ............. G01N 21/8803
                                                702/167
2015/0116582 A1* 4/2015 Yoshikawa ........... H04N 23/73
                                                348/362
2015/0253129 A1* 9/2015 Ohnishi ................ G01B 11/24
                                                348/87
2023/0137785 A1* 5/2023 Hammersberg ... G06V 40/1394
                                                382/124

* cited by examiner

100

SURFACE SHAPE MEASURING APPARATUS AND SURFACE SHAPE MEASURING METHOD

CROSS-REFERENCE TO RELATED APPLICATIONS

This application is based upon and claims priority to Japanese Patent Application No. 2023-084778, filed on May 23, 2023, the entire contents of which are incorporated herein by reference.

BACKGROUND

1. Field of the Invention

The present disclosure relates to surface shape measuring apparatuses and surface shape measuring methods. The surface shape measuring apparatus may sometimes be referred to as a surface profile measuring apparatus or a profilometer.

2. Description of the Related Art

For example, Japanese Laid-Open Patent Publication No. 2010-197391 proposes an apparatus configured to reflect a pattern displayed on a surface of a target by a specular surface, record an image of reflected light, and measure a shape of the specular surface based on a positional relationship between the image of the reflected light and the pattern. Further, Japanese Laid-Open Patent Publication No. 2004-354283 proposes an apparatus including a semi-transparent mirror that splits light from an illumination unit between optical paths of a camera and an object surface in order to inspect the object surface that is close to a specular surface, and configured to perform an inspection by capturing reflected light from the object surface transmitted through the semi-transparent mirror using a camera.

However, in the apparatus proposed in Patent Document 1, the pattern is illuminated on the specular surface as the surface to be measured from an oblique direction, and the image acquired from the illumination light reflected by the surface to be measured is recorded, and thus, a size the apparatus may increase in some cases. Further, in the apparatus proposed in Patent Document 2, because a splitting and merging optical system using the semi-transparent mirror is disposed between the specular surface and an imaging device such as the camera, the size of the apparatus may also increase in some cases.

SUMMARY

One object according to an aspect of the present disclosure is to provide a surface shape measuring apparatus for measuring a specular surface that can be reduced in size, and a surface shape measuring method using such a surface shape measuring apparatus.

According to one aspect of the present disclosure, a surface shape measuring apparatus for measuring a specular surface includes an illuminator configured to illuminate the specular surface with a first light pattern; an imaging device configured to capture an image of a second light pattern which is light transmitted through the illuminator after the first light pattern is reflected by the specular surface; and a processing apparatus configured to acquire a positional deviation amount of the second light pattern from a predetermined position in the image captured by the imaging device, and to output information related to a surface shape of the specular surface acquired from the positional deviation amount.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DETAILED DESCRIPTION

Figure 1:
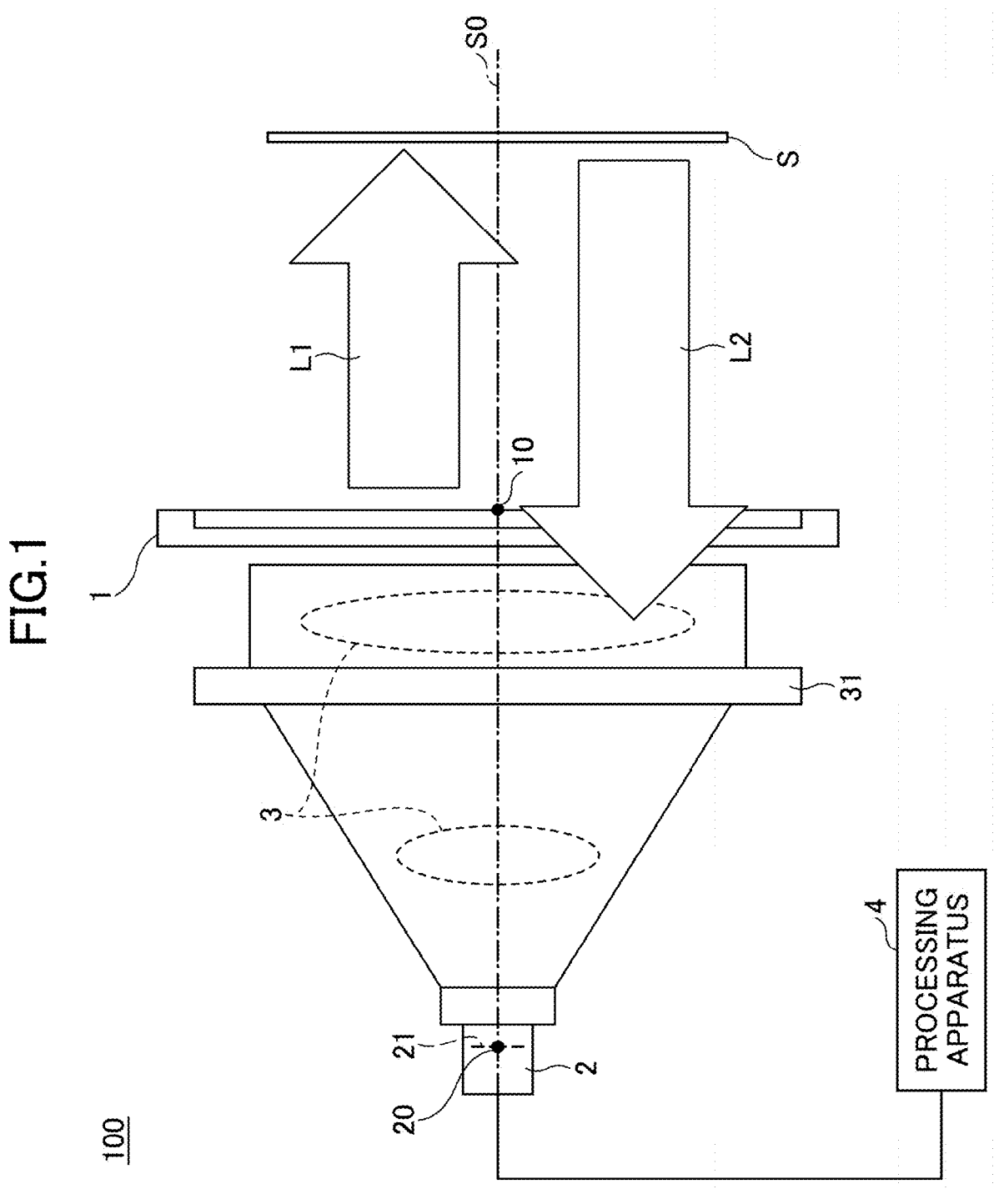
FIG. 1 is a diagram schematically illustrating an overall configuration of a surface shape measuring apparatus according to one embodiment.

Hereinafter, embodiments of the present disclosure will be described in detail with reference to the drawings. In the drawings, identical constituent elements or components are designated by the same reference numerals, and a redundant description thereof may be omitted, as appropriate.

The embodiments described below are merely examples of a surface shape measuring apparatus and a surface shape measuring method implementing technical concepts of the present disclosure, and the present disclosure is not limited to the embodiments described below. The dimensions, materials, shapes, relative arrangements, or the like of the constituent elements or components described below are intended to illustrate examples of the present disclosure, and not to limit the scope of the present disclosure, unless otherwise indicated. In addition, for the sake of convenience, the size, positional relationship, or the like of the constituent elements or components illustrated in the drawings may be exaggerated for the purposes of clarifying and facilitating understanding of the description.

Configuration Example of Surface Shape Measuring Apparatus 100

FIG. 1 is a diagram schematically illustrating an example of the overall configuration of a surface shape measuring apparatus 100 according to one embodiment. The surface shape measuring apparatus 100 is an apparatus for measuring a surface shape of a specular surface S. The specular surface S corresponds to an object to be measured by the surface shape measuring apparatus 100. As illustrated in FIG. 1, the surface shape measuring apparatus 100 includes an illuminator 1, an imaging device 2, a lens 3, and a processing apparatus 4.

The illuminator 1 illuminates the specular surface S with a first light pattern L1. The imaging device 2 captures an image of a second light pattern L2 transmitted through the illuminator 1 after the first light pattern L1 from the illuminator 1 is reflected by the specular surface S.

More specifically, the first light pattern L1 illuminates the specular surface S from a direction substantially along a normal S0 to the specular surface S. The first light pattern L1 from the illuminator 1 is reflected by the specular surface S in a direction substantially along the normal S0 to the specular surface S. The second light pattern L2 is the light transmitted through the illuminator 1 after the first light pattern L1 from the illuminator 1 is reflected by the specular surface S. The second light pattern L2 is transmitted through the illuminator 1, and reaches an imaging surface 21 of the imaging device 2 after being further transmitted through the lens 3. The imaging device 2 captures the image of the second light pattern L2 that reaches the imaging surface 21.

The lens 3 is disposed between the illuminator 1 and the imaging device 2. A lens barrel 31 accommodates the lens 3 therein. The lens 3 substantially forms the image of the second light pattern L2 on the imaging surface 21 of the imaging device 2. A number and arrangement of lenses forming the lens 3, a number of lens surfaces, shapes of the lens surfaces, the materials used for the lenses, or the like can be selected appropriately according to specifications or the like of the surface shape measuring apparatus 100. For example, the lens 3 may be formed by a compound lens.

The lens 3 may be a telecentric lens. The telecentric lens will be described later in more detail with reference to FIG. 6 through FIG. 12. The imaging device 2 can capture the image of the second light pattern L2 reflected by the specular surface S and thereafter transmitted through the lens 3.

The processing apparatus 4 receives the captured image from the imaging device 2. The processing apparatus 4 acquires a positional deviation amount of the second light pattern L2 from a predetermined position in the image captured by the imaging device 2, and outputs information related to a surface shape of the specular surface S acquired from the positional deviation amount.

Next, a method for acquiring the information related to the surface shape of the specular surface S by the surface shape measuring apparatus 100 will be described. A pattern included in the second light pattern L2 acquired by reflecting the illuminated first light pattern L1 by the specular surface S which is an ideal flat surface, is substantially the same as a pattern included in the first light pattern L1. On the other hand, a pattern included in the second light pattern L2 acquired by reflecting the illuminated first light pattern L1 by the specular surface S having a form error with respect to the ideal flat surface, is positionally deviated with respect to the pattern included in the first light pattern L1 and becomes a distorted pattern. The positional deviation of the second light pattern L2 with respect to the first light pattern L1 corresponds to the form error of the specular surface S with respect to the ideal flat surface.

The surface shape measuring apparatus 100 acquires an amount of distortion of the pattern included in the second light pattern L2 with respect to the pattern included in the first light pattern L1, that is, the positional deviation amount of the second light pattern L2 with respect to the first light pattern L1, in the image of the second light pattern L2 captured by the imaging device 2. The surface shape measuring apparatus 100 acquires information related to the surface shape of the specular surface S as an error of the specular surface S from the ideal flat plane, based on the positional deviation amount of the second light pattern L2 with respect to the first light pattern L1. The surface shape measuring apparatus 100 can output the acquired information related to the surface shape of the specular surface S, as a surface shape measurement result of the specular surface S.

A position of the first light pattern L1 serving as a reference for the positional deviation of the second light pattern L2 corresponds to a "predetermined position". Prior to measuring the specular surface S as a measurement target, the surface shape measuring apparatus 100 captures the image of the second light pattern L2 reflected by a reference specular surface having an ideal flat surface by the imaging device 2, thereby acquiring a reference captured image corresponding to the captured image of the first light pattern L1. A position of a pattern included in the reference captured image corresponds to the position of the first light pattern L1, and also corresponds to the "predetermined position". The surface shape measuring apparatus 100 can acquire the positional deviation amount of the second light pattern L2 from the predetermined position, by comparing the pattern included in the captured image of the second light pattern L2 reflected by the specular surface S as the measurement target captured by the imaging device 2 with the pattern included in the reference captured image.

The processing apparatus 4 outputs the measurement result of the surface shape of the specular surface S to an external device (not illustrated). Examples of the external device include an external personal computer (PC), a display device, a storage device, a communication device that communicates with an external server or the like via a network, or the like.

For example, in a surface shape measuring apparatus using the second light pattern L2 which is reflected by the specular surface S but does not pass through an illuminator, the illuminator and an imaging device are arranged in a direction inclined with respect to a normal S0 to the specular surface S, that is, in an oblique direction, and thus, the size of the surface shape measuring apparatus may increase. On the other hand, in a surface shape measuring apparatus having a splitting and merging optical system using a semi-transparent mirror, disposed between the specular surface S and an imaging device, for example, the size of the surface shape measuring apparatus may also increase.

In contrast, according to the present embodiment, the imaging device 2 of the surface shape measuring apparatus 100 captures the second light pattern L2 that is the light transmitted through the illuminator 1 after the first light pattern L1 from the illuminator 1 is reflected by the specular surface S. The surface shape measuring apparatus 100 measures the surface shape of the specular surface S based on the captured image. In the present embodiment, the illuminator 1 and the imaging device 2 are not arranged in a direction inclined with respect to the normal S0 to the specular surface S. For this reason, it is possible to provide the surface shape measuring apparatus 100 having a size which can be reduced compared to the case where the illuminator and the imaging device are arranged in the direction inclined with respect to the normal S0 to the specular surface S. Further, in the present embodiment, because a splitting and merging optical system using a semi-transparent mirror is not disposed between the specular surface S and the imaging device 2, it is possible to provide the surface shape measuring apparatus 100 having a small size compared to the case where the splitting and merging optical system using the semi-transparent mirror is disposed between the specular surface S and the imaging device 2. From a viewpoint of reducing the size of the surface shape measuring apparatus 100, the illuminator 1 and the imaging device 2 are preferably arranged on the normal S0 to the specular surface S. In addition, from a viewpoint of reducing the size of the surface shape measuring apparatus 100, it is more preferable that a center 10 of the illuminator 1 and a center 20 of the imaging device 2 are arranged on the normal to the specular surface S. In the present embodiment, it is not essential to provide the lens 3. The advantageous effects described above is obtainable even in a case where the lens 3 is not provided.

Configuration Example of Illuminator 1

Figure 2:
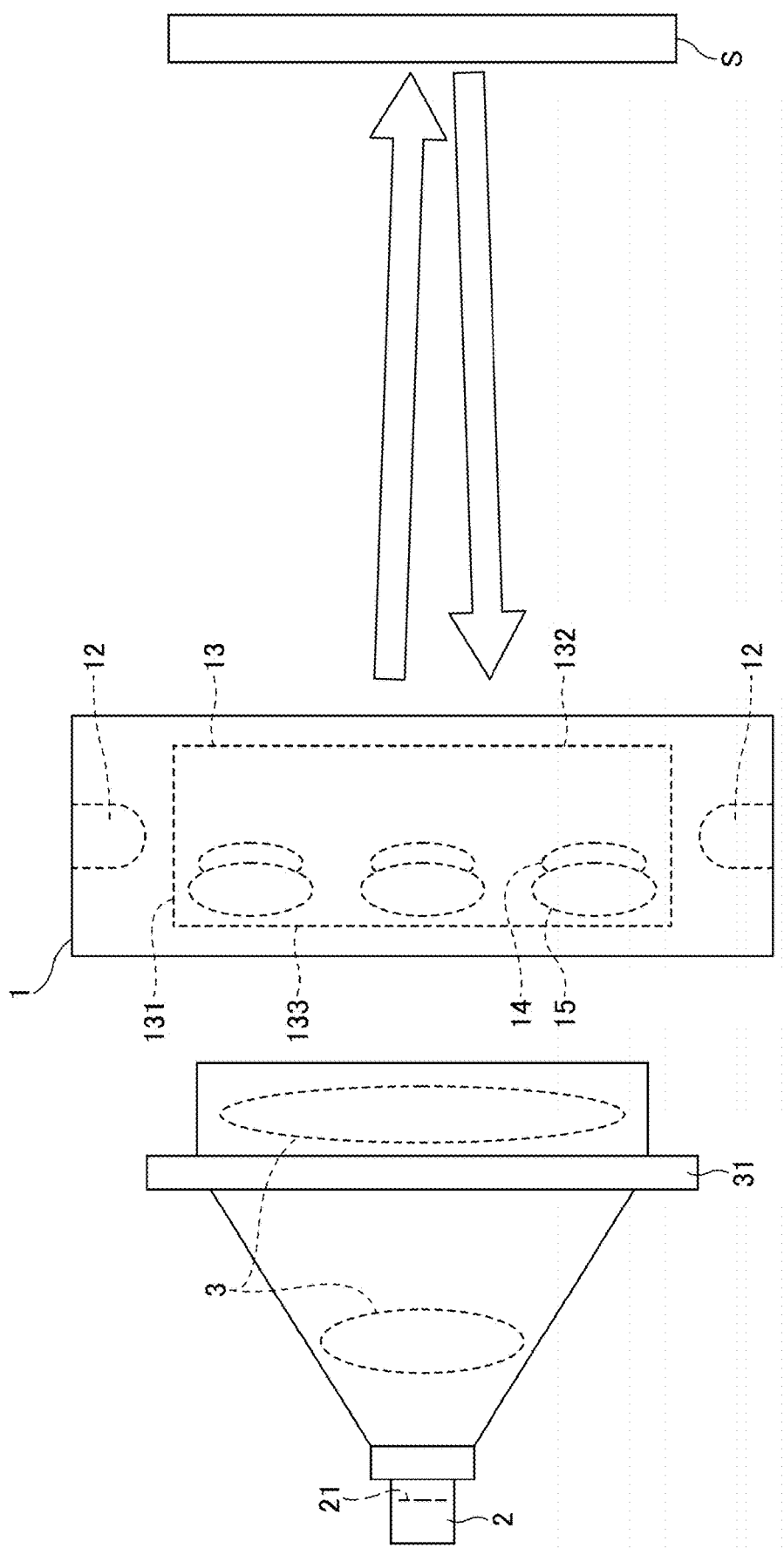
FIG. 2 is a diagram schematically illustrating a configuration of an illuminator according to one embodiment.

FIG. 2 is a diagram schematically illustrating an example of a detailed configuration of the illuminator 1. As illustrated in FIG. 2, the illuminator 1 includes a light source 12, a light guide plate 13, a light emitting part 14, and a light blocking part 15.

The light source 12 may be a light emitting diode (LED) or the like. The light source 12 is disposed at a position where light emitted from the light source 12 can enter inside the light guide plate 13. The illuminator 1 may include one or more light sources 12 outside the light guide plate 13. In the example illustrated in FIG. 2, the illuminator 1 includes a pair of light sources 12 disposed on both sides of the light guide plate 13.

The light guide plate 13 has a light incident surface 131, a first principal surface 132, and a second principal surface 133. The light incident surface 131 intersects with each of the first principal surface 132 and the second principal surface 133. The first principal surface 132 and the second principal surface 133 are substantially parallel to each other. The term "substantially parallel" may include an error of 10 degrees or less from a perfectly parallel state.

The light guide plate 13 guides the light emitted from the light source 12 and incident to the light incident surface 131 to enter inside the light guide plate 13. The light guide plate 13 can guide the incident light while totally reflecting the light by each of the first principal surface 132 and the second principal surface 133. For example, an LED that emits white light can be used for the light source 12.

The light emitting part 14 is disposed on a surface of the light guide plate 13, and emits fluorescence in response to receiving the light guided by the light guide plate 13. The light emitting part 14 may be disposed inside the light guide plate 13 instead of being disposed on the surface of the light guide plate 13. For example, the light emitting part 14 can be disposed on the surface of the light guide plate 13 by printing the light emitting part 14 on the surface of the light guide plate 13.

The illuminator 1 can illuminate the specular surface S with the first light pattern L1 emitted from the light emitting part 14.

The pattern included in the first light pattern L1 may be a dot pattern. The illuminator 1 can illuminate the specular surface S with the first light pattern L1 including the dot pattern, using fluorescence emitted from each of the plurality of light emitting parts 14 by arranging the plurality of light emitting parts 14 on the light guide plate 13 so that each of the plurality of light emitting parts 14 forms a dot. In other words, the dot-shaped light emitting parts 14 emit the fluorescence in response to receiving the light guided inside the light guide plate 13, and can project bright spots on the surface of the specular surface S. The positional deviation amount of the second light pattern L2 from the predetermined position is acquired for each of the plurality of dot patterns included in the second light pattern L2. The surface shape measuring apparatus 100 uses the dot pattern for the first light pattern L1, thereby facilitating calculation of the positional deviation amount of the dots of the second light pattern L2 from the predetermined position by image processing.

The light blocking part 15 is disposed near the light emitting part 14 disposed on the light guide plate 13 on a side where the imaging device 2 is located. For example, when the fluorescence emitted from the light emitting part 14 is directly incident to the imaging device 2 without via the specular surface S, a measurement error occurs because a measurement result acquired does not reflect the specular surface S. The surface shape measuring apparatus 100 can avoid the fluorescence emitted from the light emitting part 14 from directly entering the imaging device 2 and reduce the measurement error, by blocking the fluorescence from the light emitting part 14 with the light blocking part 15.

A plurality of light blocking parts 15 are arranged in a dot pattern on the surface of the light guide plate 13, according to the plurality of light emitting parts 14 arranged in a dot pattern. The plurality of light blocking parts 15 correspond one-to-one (1:1) to the plurality of light emitting parts 14, respectively. From a viewpoint of improving light blocking properties, an area of each light blocking part 15 is preferably larger than an area of each light emitting part 14.

In the present embodiment, the light emitting part 14 and the light blocking part 15 have a circular shape in a plan view, respectively, and a relationship $1.05 \times B <= A <= 1.15 \times B$ may be satisfied, where A denotes a diameter of the light blocking part 15, B denotes a diameter of the light emitting part 14, and a symbol "<=" denotes "less than or equal to". The surface shape measuring apparatus 100 can suitably avoid the light emitted from the light emitting part 14 from directly entering the imaging device 2 by satisfying the relationship (or condition) described above, and reduce the measurement error.

If the size of the reflected light from the specular surface S were to substantially match the size of the dot-shaped light emitting part 14, the reflected light would be blocked by the dot-shaped light blocking part 15, and thus, the imaging device 2 would not be able to capture the image of the dot pattern. However, in the surface shape measuring apparatus 100, the reflected light from the specular surface S slightly spreads with respect to the light illuminating the specular surface S. For this reason, the reflected light can reach the imaging surface 21 of the imaging device 2 by leaking from a periphery of the dot-shaped light blocking part 15 or being diffracted at an edge of the dot-shaped light blocking part 15. Accordingly, the surface shape measuring apparatus 100 can measure the surface shape of the specular surface S even in the case where the size of the reflected light from the specular surface S substantially matches the size of the dot-shaped light emitting part 14.

Functions of Telecentric Lens

Figure 3:
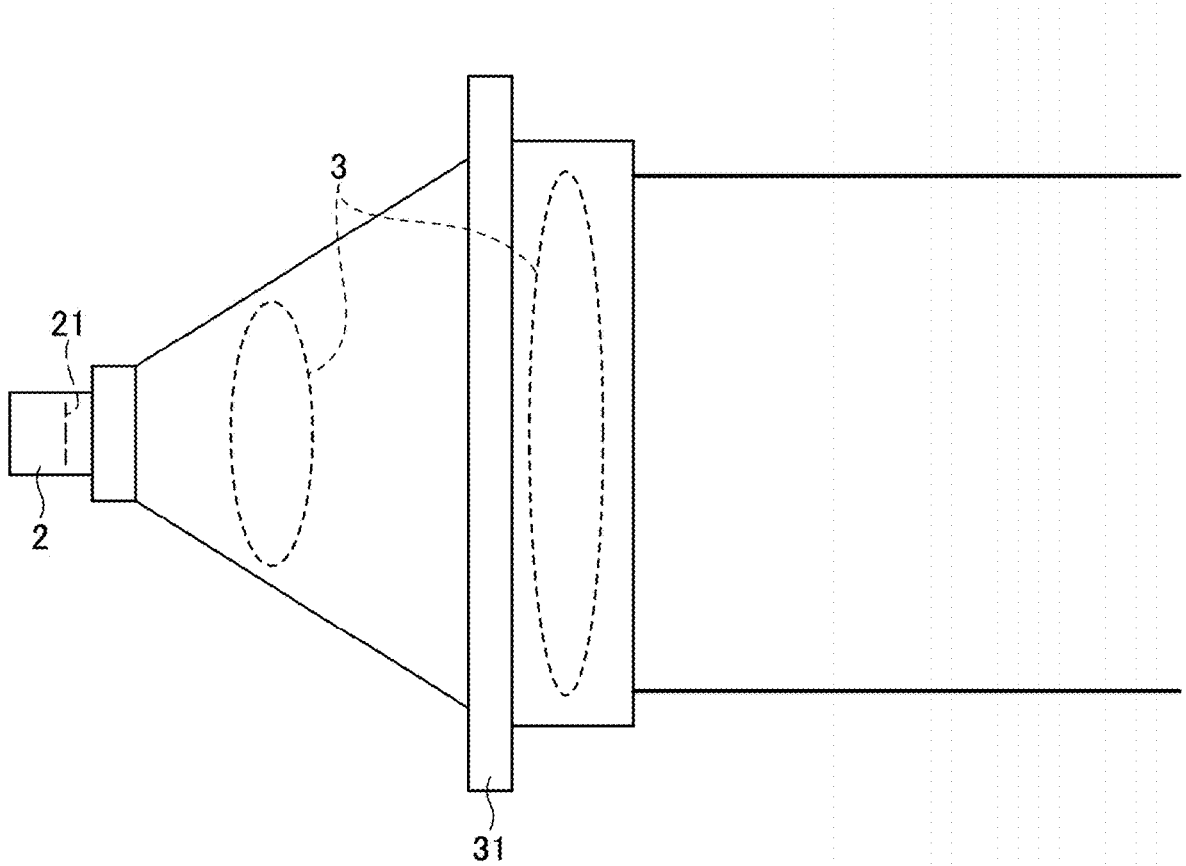
FIG. 3 is a diagram schematically illustrating an angle of view of a telecentric lens.
Figure 4:
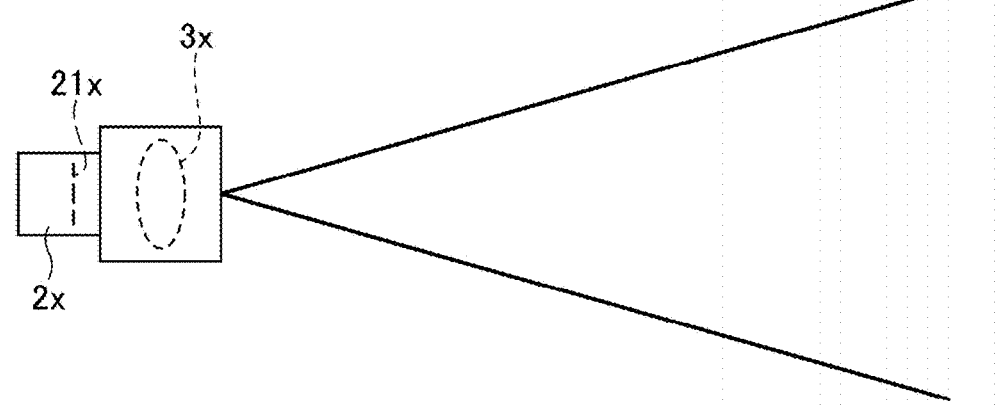
FIG. 4 is a diagram schematically illustrating an angle of view of a non-telecentric lens.
Figure 5:
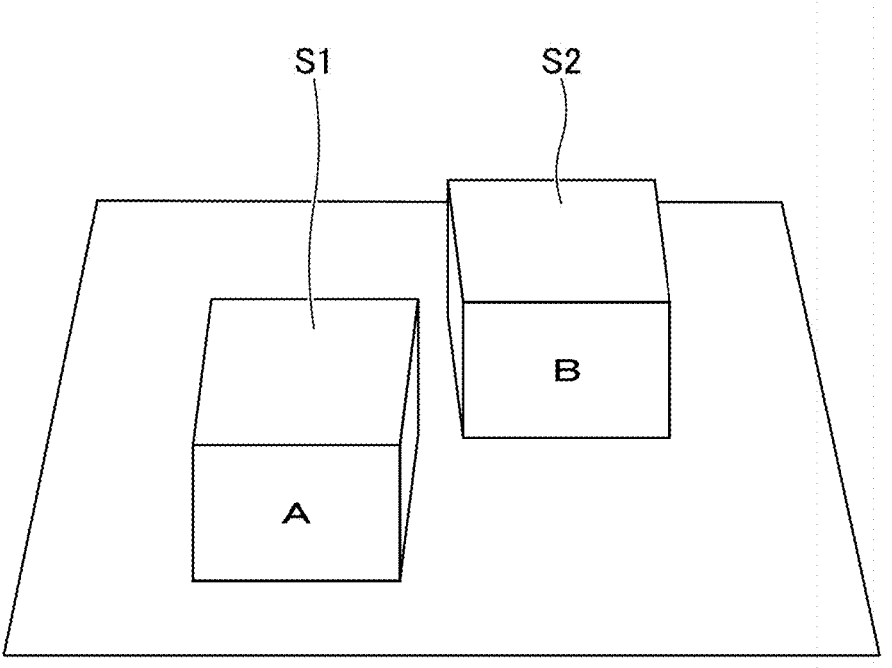
FIG. 5 is a diagram illustrating an arrangement of a plurality of subjects having different subject distances.
Figure 6:
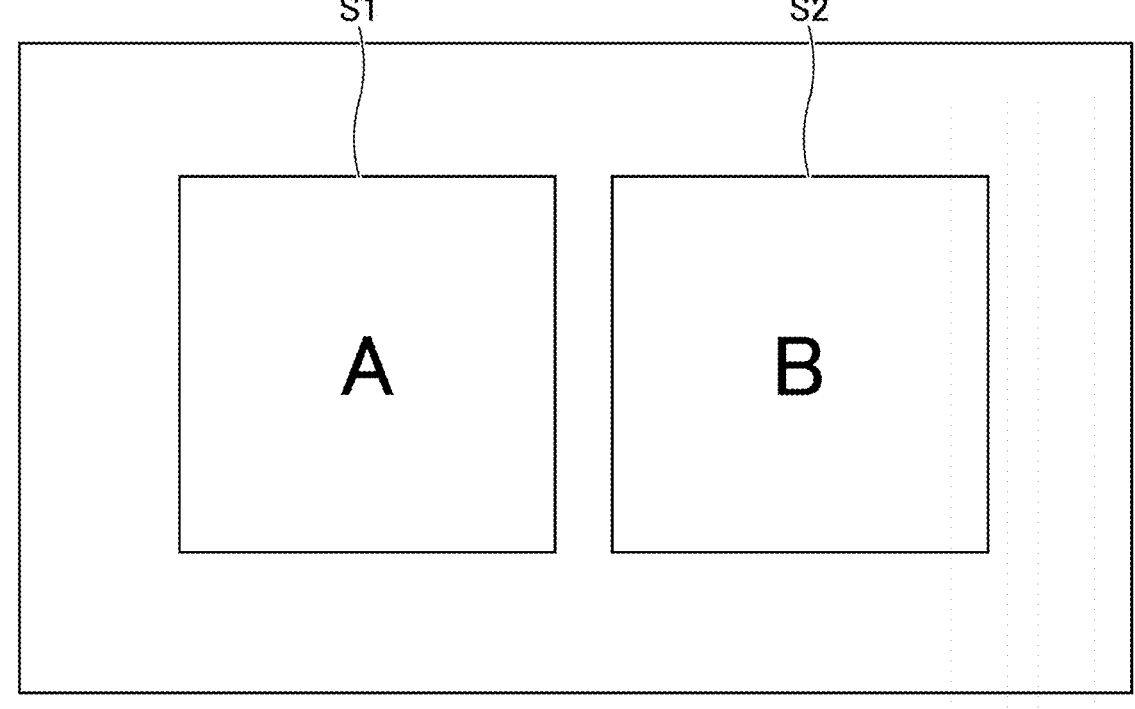
FIG. 6 is a diagram illustrating a captured image of the subjects in FIG. 5 using the telecentric lens.
Figure 7:
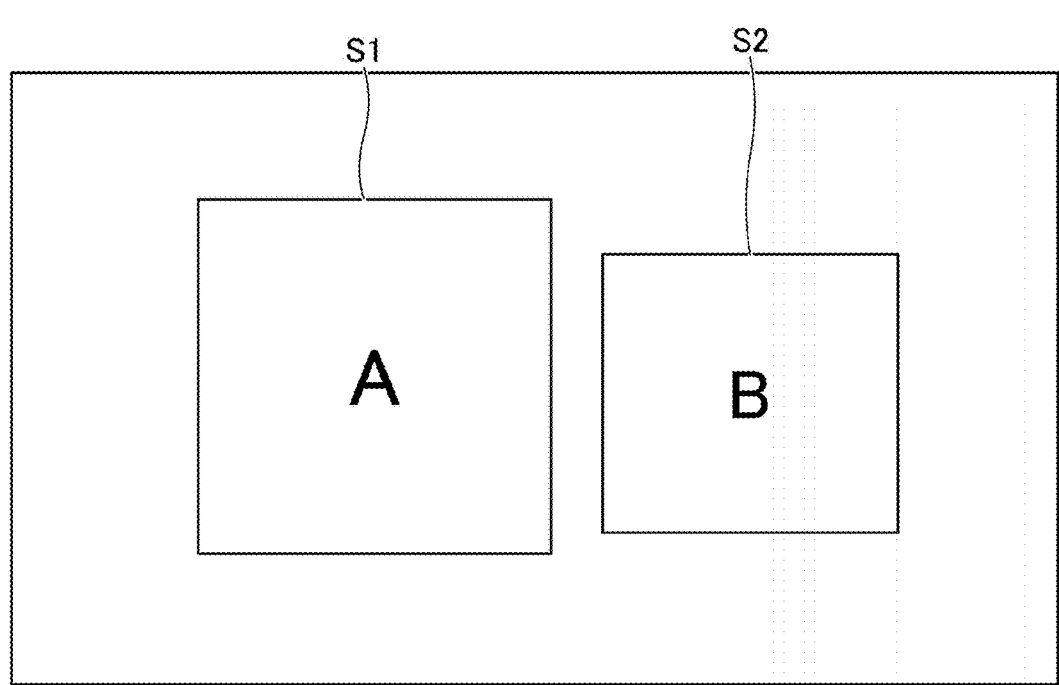
FIG. 7 is a diagram illustrating a captured image of the subjects in FIG. 5 using the non-telecentric lens.
Figure 8:
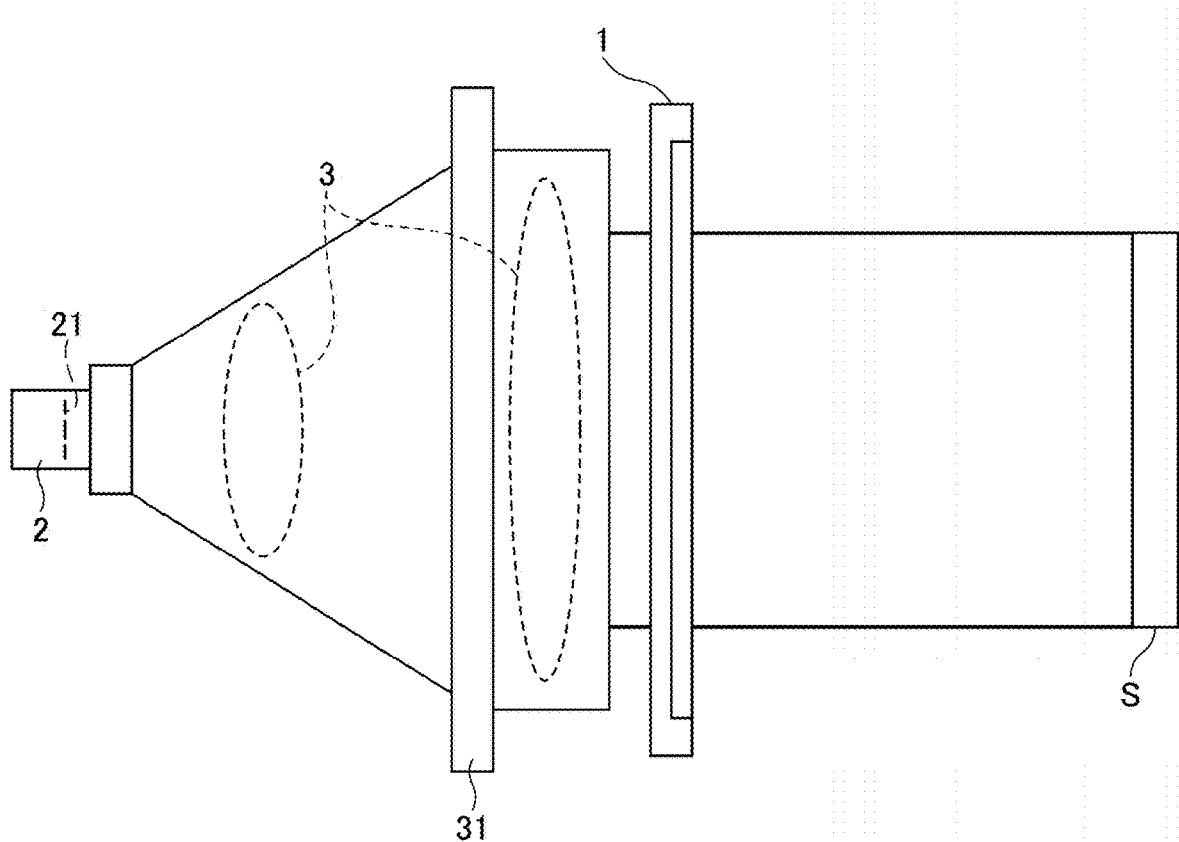
FIG. 8 is a diagram schematically illustrating the illuminator when using the telecentric lens.
Figure 9:
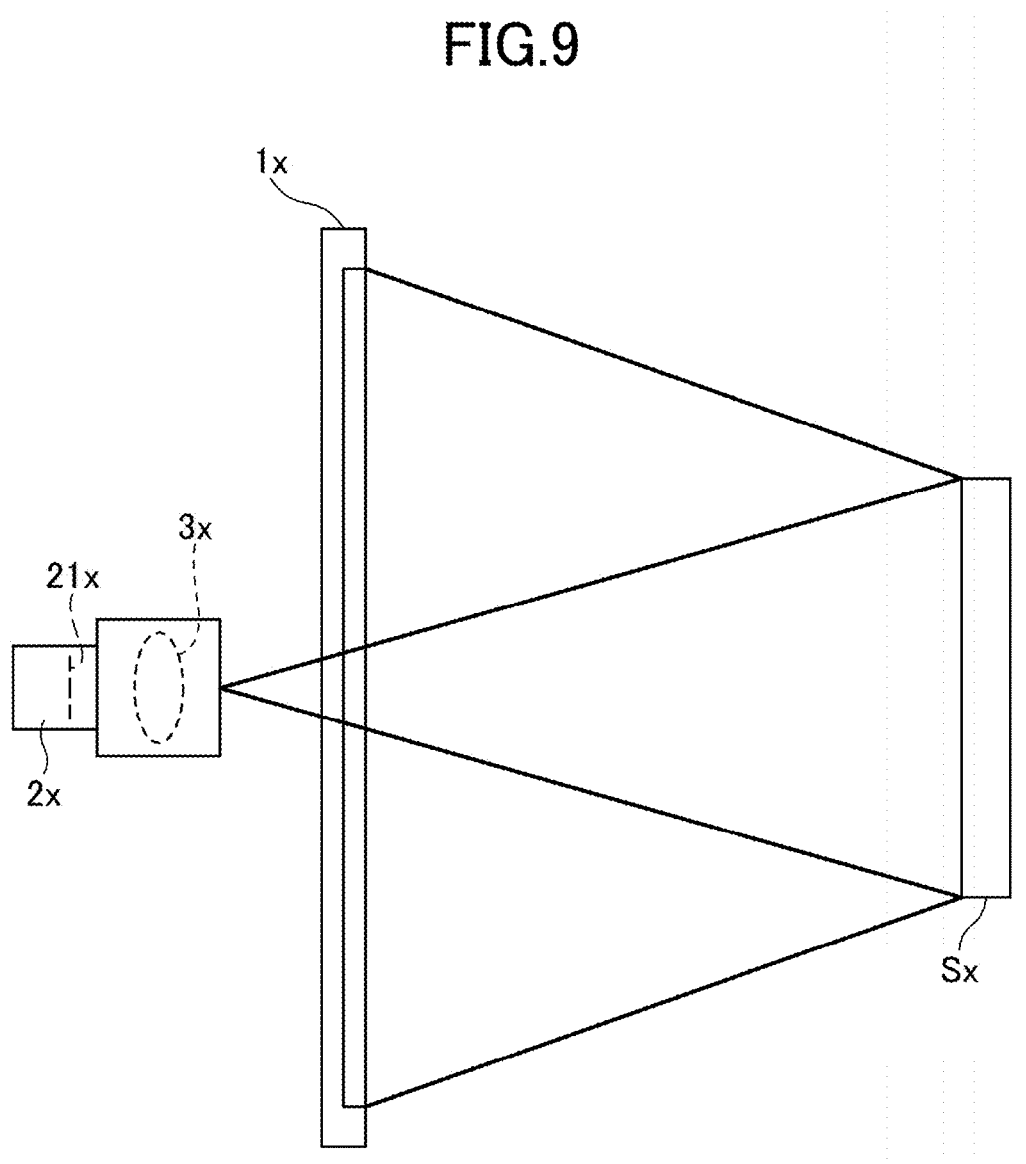
FIG. 9 is a diagram schematically illustrating the illuminator when using the non-telecentric lens.

Functions of the lens 3 for the case where the lens 3 is the telecentric lens will be described, with reference to FIG. 3 through FIG. 9. FIG. 3 is a diagram schematically illustrating an angle of view of the telecentric lens. FIG. 4 is a diagram schematically illustrating an angle of view of a non-telecentric lens. The non-telecentric lens refers to a lens that is not a telecentric lens. FIG. 5 is a diagram illustrating an arrangement of a plurality of subjects having different subject distances. FIG. 6 is a diagram illustrating a captured image of the subjects in FIG. 5 using the telecentric lens. FIG. 7 is a diagram illustrating a captured image of the subjects in FIG. 5 using the non-telecentric lens. FIG. 8 is a diagram schematically illustrating the illuminator when using the telecentric lens. FIG. 9 is a diagram schematically illustrating the illuminator when using the non-telecentric lens.

In the present embodiment, from a viewpoint of reducing influence of distance variations among the illuminator 1, the imaging device 2, and the specular surface S on the surface shape measurement, it is preferable to use a telecentric lens for the lens 3.

The lens 3, which is the telecentric lens, has an angle of view of 0 degrees as illustrated in FIG. 3. For this reason, compared to a case where a lens 3x, which is a non-telecentric lens illustrated in FIG. 4, is used in the surface shape measuring apparatus, it is possible to eliminate a change in the captured image caused by parallax, and it is possible to reduce the influence of the parallax on the surface shape measurement.

Further, suppose that a first subject S1 and a second subject S2 are captured by the imaging device in a case where the first subject S1 and the second subject S2 having substantially the same size are located at different subject distances from the imaging device as illustrated in FIG. 5. As illustrated in FIG. 6, in the case where the telecentric lens is used for the lens 3, the size of the first subject S1 and the size of the second subject S2 in the captured image become substantially the same. On the other hand, as illustrated in FIG. 7, in the case where the non-telecentric lens is used for the lens 3x, the subject positioned far appears small and the subject positioned near appears large in the captured image, and thus, the sizes of the first subject S1 and the second subject S2 in the captured image become different according to the subject distances from the imaging device. The difference between the sizes of the subjects in the captured image according to the subject distances from the imaging device may influence the surface shape measurement. In contrast, in the case where the telecentric lens is used for the lens 3, it is possible to reduce changes in the sizes of the subjects appearing in the captured image according to the subject distances from the imaging device, and thus, it is possible to reduce the influence of the subject distances on the surface shape measurement.

As illustrated in FIG. 8, when the telecentric lens is used for the lens, the angle of view is 0 degrees, and thus, the surface shape measuring apparatus 100 can measure the surface shape of the entire specular surface S using the illuminator 1 having substantially the same size as the specular surface S. On the other hand, as illustrated in FIG. 9, when the non-telecentric lens is used for the lens 3x, the illuminator 1 having a size larger than the specular surface S may be required. By using the telecentric lens for the lens 3, it is possible to prevent the size of the illuminator 1 from increasing, and reduce the size of the surface shape measuring apparatus 100. Further, the surface shape measuring apparatus 100 can reduce a change in the captured image caused by a change in an optical magnification or a lens distortion according to the subject distance, by using the telecentric lens for the lens 3. For this reason, the surface shape measuring apparatus 100 does not require a process for correcting the optical magnification or the lens distortion, and can simplify arithmetic processing for the surface shape measurement.

Configuration Example of Processing Apparatus 4

Hardware Configuration Example

Figure 10:
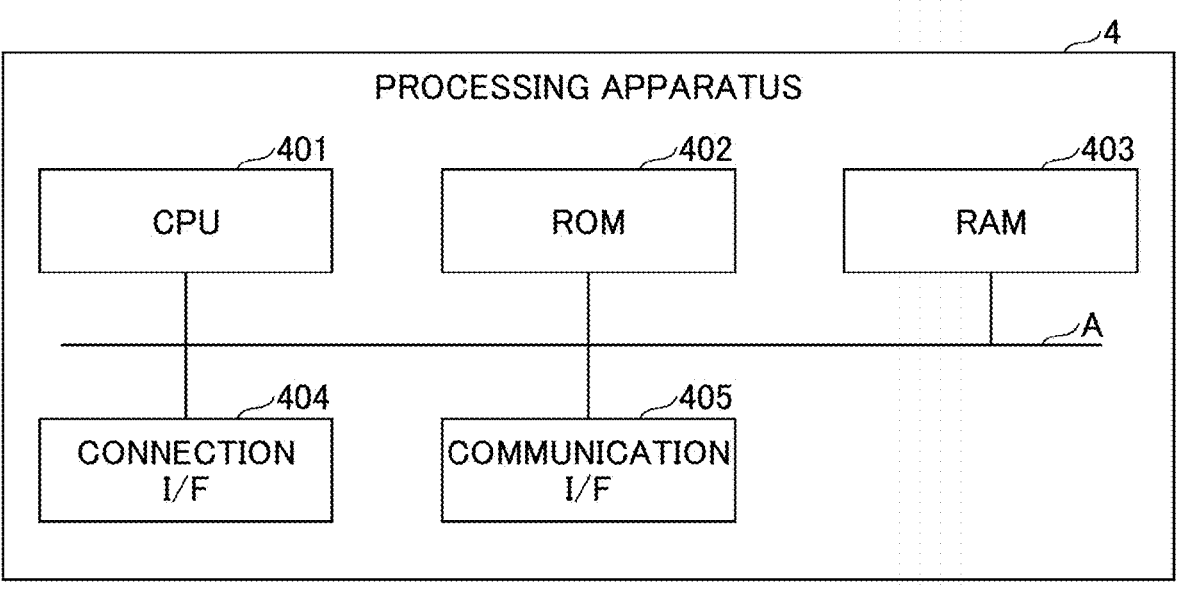
FIG. 10 is a block diagram illustrating a hardware configuration of a processing apparatus according to one embodiment.

FIG. 10 is a block diagram illustrating an example of a hardware configuration of the processing apparatus 4. The processing apparatus 4 is configured by a computer, for example. The processing apparatus 4 includes a central processing unit (CPU) 401, a read only memory (ROM) 402, a random access memory (RAM) 403, a connection interface (I/F) 404, and a communication I/F 405. These constituent elements of the processing apparatus 4 are connected to one another via a system bus A, and are communicable with one another.

The CPU 401 performs a control processing including various kinds of arithmetic processing. The ROM 402 stores a program used for driving the CPU 401, such as an initial program loader (IPL) or the like. The RAM 403 is used as a work area of the CPU 401. The connection I/F 404 is an interface for connecting the processing apparatus 4 to various external devices. The external devices include the imaging device 2 or the like.

The communication I/F 405 is an interface for communicating with the external device via a communication network or the like. For example, the processing apparatus 4 is connected to the Internet via the communication I/F 405, and communicates with the external device via the Internet.

The processing apparatus 4 may include a hard disk drive/solid state drive (HDD/SSD, not illustrated) or the like, in addition to the configuration described above. The HDD/SSD stores various kinds of information, such as programs, captured images acquired by the imaging device 2, or the like.

Functional Configuration Example

Figure 11:
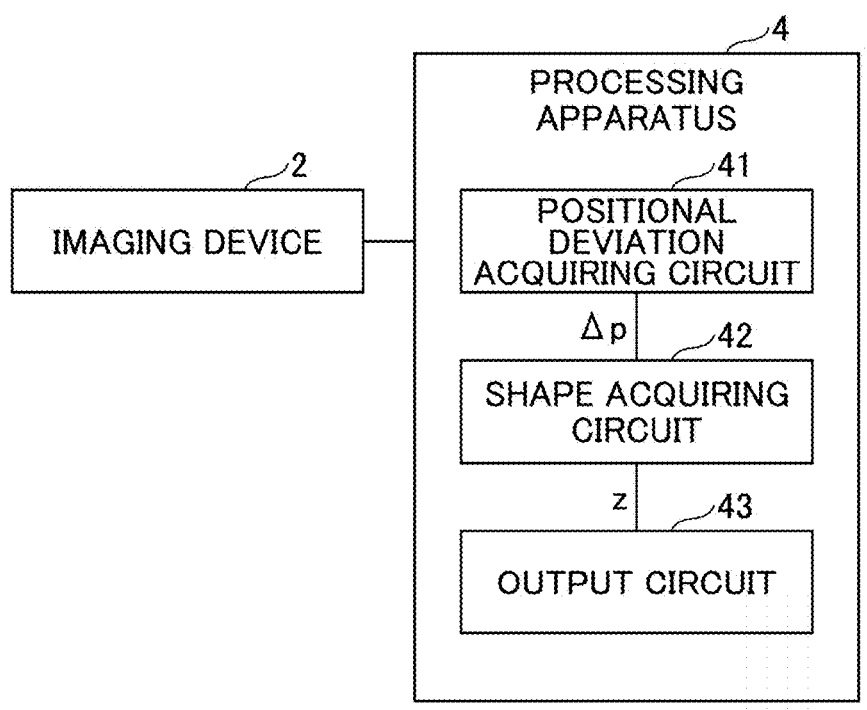
FIG. 11 is a block diagram illustrating a functional configuration of the processing apparatus according to one embodiment.
Figure 12:
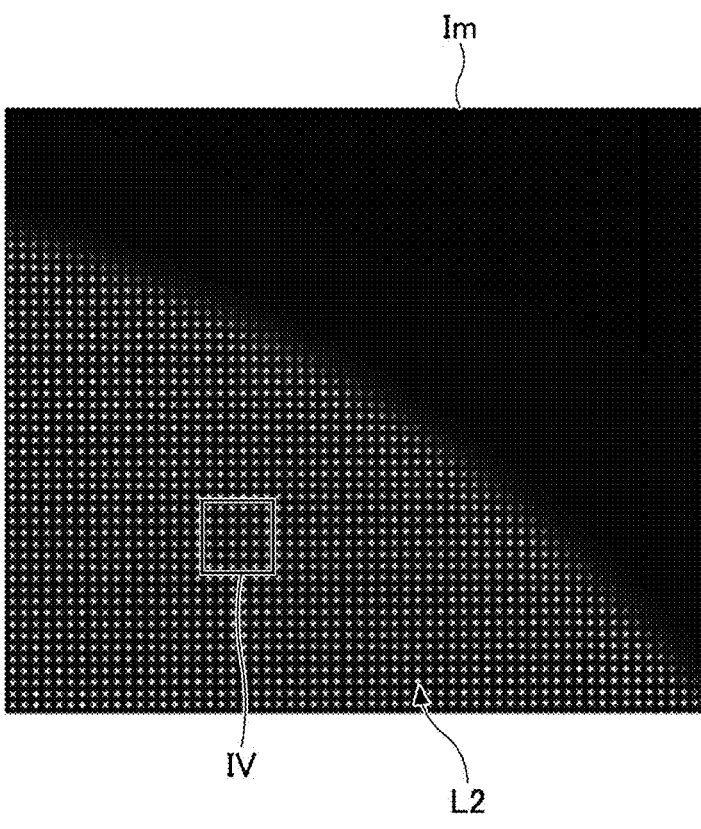
FIG. 12 is a diagram illustrating a captured image of a second light pattern according to one embodiment.
Figure 13:
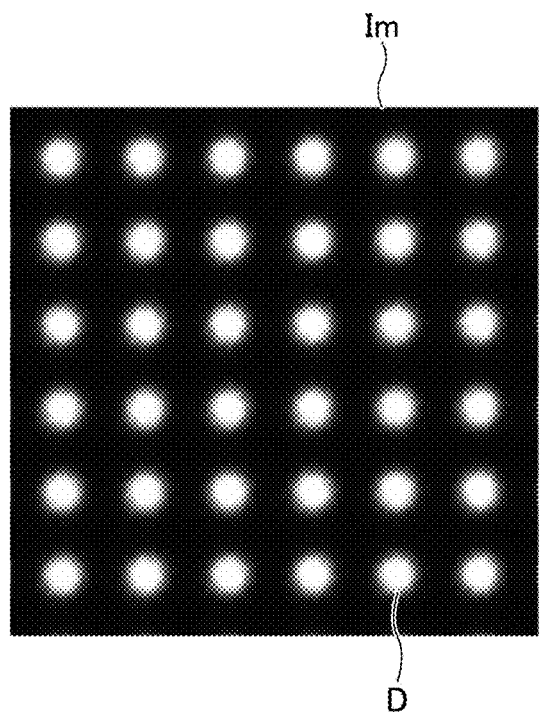
FIG. 13 is an enlarged view of a region IV in FIG. 12.
Figure 14:
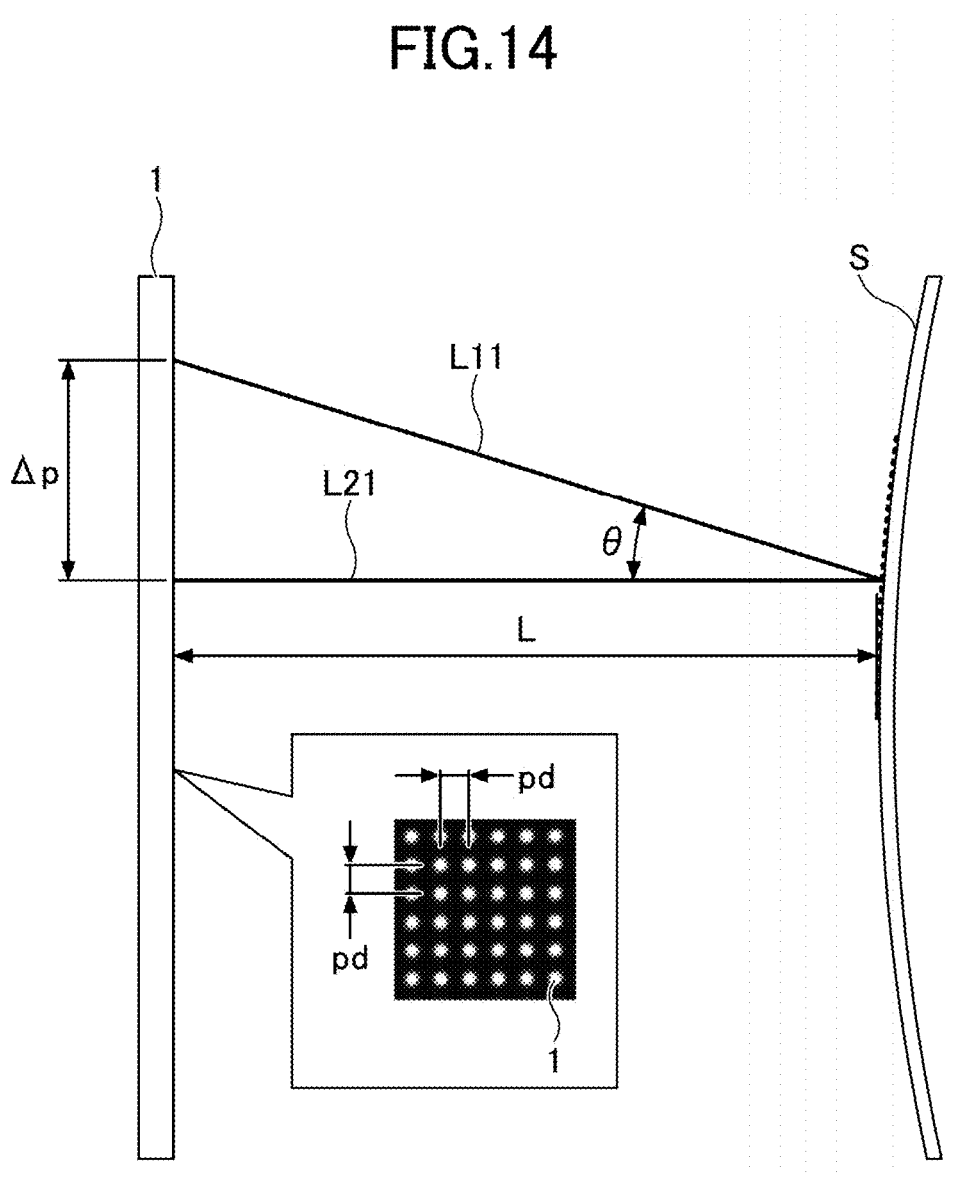
FIG. 14 is a diagram for schematically explaining a positional deviation amount of the second light pattern according to one embodiment.

A functional configuration of the processing apparatus 4 will be described with reference to FIG. 11 through FIG. 14. FIG. 11 is a block diagram illustrating an example of the functional configuration of the processing apparatus 4. FIG. 12 is a diagram illustrating a captured image of the second light pattern L2. FIG. 13 is an enlarged view of a region IV in FIG. 12. FIG. 14 is a diagram for schematically explaining the positional deviation amount of the second light pattern L2.

As illustrated in FIG. 11, the processing apparatus 4 includes a positional deviation acquiring circuit (or a positional deviation acquiring part) 41, a shape acquiring circuit (or a shape acquiring part) 42, and an output circuit (or an output part) 43. The functions of the positional deviation acquiring circuit 41 and the shape acquiring circuit 42 can be implemented in a processor, such as the CPU 401 or the like, by executing a program stored in a nonvolatile memory, such as the ROM 402 or the like, and performing processes defined by the program. The functions of the output circuit 43 can be implemented in the connection I/F 404, the communication I/F 405, or the like. Some of the functions of the processing apparatus 4 may be implemented in an external device, such as a PC, a server, or the like, or may be implemented in a distributed processing between the processing apparatus 4 and the external device.

The positional deviation acquiring circuit 41 acquires a positional deviation amount of the second light pattern L2 from a predetermined position in the image captured by the imaging device 2. As illustrated in FIG. 12 and FIG. 13, a captured image Im includes a dot pattern. Each dot D of a plurality of dots D is formed by the fluorescence emitted from the light emitting part 14 included in the illuminator 1 illustrated in FIG. 2. When the specular surface S has a form error with respect to an ideal flat surface, the positions of the plurality of dots D are shifted from predetermined positions corresponding to the dots D. The pattern formed by the plurality of dots D becomes distorted due to the positional deviation of the plurality of dots D. For example, the positional deviation acquiring circuit 41 can acquire, by calculation, a positional deviation amount Ap of a center of gravity position of each dot D of the plurality of dots D with respect to coordinates of a plurality of "predetermined positions" determined in advance on the captured image Im.

In FIG. 11, the shape acquiring circuit 42 acquires information on the surface shape of the specular surface S from the positional deviation amount Δp acquired by the positional deviation acquiring circuit 41. As illustrated in FIG. 14, an angle θ formed by illumination light L11 illuminating the specular surface S and reflection light L21 of the illumination light L11 from the specular surface S may be acquired from the following formula (1). In the formula (1), L denotes a distance between the illuminator 1 and the specular surface S.

$$\theta = \tan^{-1}(\Delta p / L) / 2 \qquad (1)$$

Further, from a predetermined arrangement interval pd of the dot pattern, a height deviation amount z of the plane for each dot D may be acquired from the following formula (2).

$$z = pd \, \tan \theta \qquad (2)$$

In FIG. 11, the shape acquiring circuit 42 can acquire the height deviation amount z as the information related to the surface shape of the specular surface S, using the formulas (1) and (2) described above. The shape acquiring circuit 42 calculates the height deviation amount z of each dot D of the plurality of dots D included in a captured image Im2 in an outward direction from a position with a smallest deviation amount in the second light pattern L2 appearing in the captured image Im2. Hence, the shape acquiring circuit 42 can acquire the height deviation amount z of the entire specular surface S, as the information related to the surface shape. The output circuit 43 outputs the height deviation amount z of the entire specular surface S acquired by the shape acquiring circuit 42 to the external device.

Although the preferred embodiments are described above in detail, the present disclosure is not limited to the embodiments described above, and various variations, modifications, and substitutions can be made to the embodiments without departing from the scope of the present disclosure.

All the numbers such as ordinal numbers and quantities used in the description of the embodiments are examples for specifically describing the technique of the present invention, and the present invention is not limited to the exemplified numbers. Further, the connection relationship between the constituent elements is an example for specifically describing the technique of the present disclosure, and the connection relationship for realizing the functions of the present disclosure is not limited thereto.

According to the present disclosure, because the size of the surface shape measuring apparatus can be reduced, the surface shape measurement can be simplified, and various applications of the surface shape measurement are possible.

Various aspects of the subject matter described herein may be set out non-exhaustively in the following numbered clauses:

[1] A surface shape measuring apparatus for measuring a specular surface, comprising:
   an illuminator configured to illuminate the specular surface with a first light pattern;
   an imaging device configured to capture an image of a second light pattern which is light transmitted through the illuminator after the first light pattern from the illuminator is reflected by the specular surface; and
   a processing apparatus configured to acquire a positional deviation amount of the second light pattern from a predetermined position in the image captured by the imaging device, and to output information related to a surface shape of the specular surface acquired from the positional deviation amount.

[2] The surface shape measuring apparatus according to clause [1], wherein the illuminator includes:
   one or more light sources;
   a light guide plate having a light incident surface, a first principal surface, and a second principal surface, and configured to guide light emitted from the one or more light sources and incident thereto through the light incident surface; and
   a light emitting part, disposed in one of an inside and a surface of the light guide plate, and configured to emit fluorescence in response to receiving light guided by the light guide plate,
   and the illuminator emits the first light pattern formed to include the fluorescence emitted from the light emitting part.

[3] The surface shape measuring apparatus according to clause [2], wherein the illuminator includes a light blocking part disposed near the light emitting part disposed on the light guide plate on a side where the imaging device is located.

[4] The surface shape measuring apparatus according to clause [3], wherein:
   each of the light emitting part and the light blocking part has a circular shape in a plan view, and
   a diameter A of the light blocking part and a diameter B of the light emitting part satisfy a relationship 1.05×B<=A<=1.15×B.

[5] The surface shape measuring apparatus according to any of clauses [1] to [4], wherein the pattern included in the first light pattern is a dot pattern.

[6] The surface shape measuring apparatus according to any one of clauses [1] to [5], further comprising:
   a telecentric lens disposed between the illuminator and the imaging device,
   wherein the imaging device captures the image of the second light pattern reflected by the specular surface, transmitted through the illuminator, and further transmitted through the telecentric lens.

[7] A surface shape measuring method for measuring a specular surface by a surface shape measuring apparatus having an illuminator, an imaging device, and a processing apparatus, the surface shape measuring method comprising:

illuminating, by the illuminator, the specular surface with a first light pattern;

capturing, by the imaging device, an image of a second light pattern which is light transmitted through the illuminator after the first light pattern from the illuminator is reflected by the specular surface; and acquiring, by the processing apparatus, a positional deviation amount of the second light pattern from a predetermined position in the image captured by the imaging device, and outputting information related to a surface shape of the specular surface acquired from the positional deviation amount.

According to the embodiments of the present disclosure, it is possible to provide a surface shape measuring apparatus for measuring a specular surface that can be reduced in size, and a surface shape measuring method using such a surface shape measuring apparatus.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A surface shape measuring apparatus for measuring a specular surface, comprising:

an illuminator having a flat plate shape and configured to illuminate the specular surface with a first light pattern;

an imaging device configured to capture an image of a second light pattern which is light transmitted through the illuminator after the first light pattern from the illuminator is reflected by the specular surface; and a processing apparatus configured to acquire a positional deviation amount of the second light pattern from a predetermined position in the image captured by the imaging device, and to output information related to a surface shape of the specular surface acquired from the positional deviation amount, wherein the illuminator includes:

one or more light sources, and a light guide plate having a light incident surface, a first principal surface facing the specular surface, and a second principal surface facing the imaging device, the light guide plate is configured to guide light emitted from the one or more light sources and incident thereto through the light incident surface, and the first principal surface and the second principal surface are substantially parallel.

2. A surface shape measuring apparatus a for measuring a specular surface, comprising:

an illuminator configured to illuminate the specular surface with a first light pattern;

an imaging device configured to capture an image of a second light pattern which is light transmitted through the illuminator after the first light pattern from the illuminator is reflected by the specular surface; and a processing apparatus configured to acquire a positional deviation amount of the second light pattern from a predetermined position in the image captured by the imaging device, and to output information related to a surface shape of the specular surface acquired from the positional deviation amount, wherein the illuminator includes:

one or more light sources;

a light guide plate having a light incident surface, a first principal surface, and a second principal surface, and configured to guide light emitted from the one or more light sources and incident thereto through the light incident surface; and a light emitting part, disposed in one of an inside and a surface of the light guide plate, and configured to emit fluorescence in response to receiving light guided by the light guide plate, and the illuminator emits the first light pattern formed to include the fluorescence emitted from the light emitting part.

3. The surface shape measuring apparatus as claimed in claim 2, wherein the illuminator includes a light blocking part disposed near the light emitting part disposed on the light guide plate on a side where the imaging device is located.

4. The surface shape measuring apparatus as claimed in claim 3, wherein:

each of the light emitting part and the light blocking part has a circular shape in a plan view, and a diameter A of the light blocking part and a diameter B of the light emitting part satisfy a relationship $1.05 \times B \leq A \leq 1.15 \times B$, wherein $\leq$ represents less than or equal to.

5. The surface shape measuring apparatus as claimed in claim 1, wherein the pattern included in the first light pattern is a dot pattern.

6. The surface shape measuring apparatus as claimed in claim 1, further comprising:

a telecentric lens disposed between the illuminator and the imaging device, wherein the imaging device captures the image of the second light pattern reflected by the specular surface, transmitted through the illuminator, and further transmitted through the telecentric lens.

7. A surface shape measuring method for measuring a specular surface by a surface shape measuring apparatus having an illuminator, an imaging device, and a processing apparatus, the illuminator including one or more light sources, a light guide plate having a light incident surface, a first principal surface, and a second principal surface, and configured to guide light emitted from the one or more light sources and incident thereto through the light incident surface, and a light emitting part disposed in one of an inside and a surface of the light guide plate and configured to emit fluorescence in response to receiving light guided by the light guide plate, the surface shape measuring method comprising:

illuminating, by the illuminator, the specular surface with a first light pattern formed to include the fluorescence emitted from the light emitting part;

capturing, by the imaging device, an image of a second light pattern which is light transmitted through the illuminator after the first light pattern from the illuminator is reflected by the specular surface; and acquiring, by the processing apparatus, a positional deviation amount of the second light pattern from a predetermined position in the image captured by the imaging device, and outputting information related to a surface shape of the specular surface acquired from the positional deviation amount.

8. A surface shape measuring apparatus for measuring a specular surface, comprising:

an illuminator having a flat plate shape and configured to illuminate the specular surface with a first light pattern;

an imaging device configured to capture an image of a second light pattern which is light transmitted through the illuminator after the first light pattern from the illuminator is reflected by the specular surface; and a processing apparatus configured to acquire a positional deviation amount of the second light pattern from a predetermined position in the image captured by the imaging device, and to output information related to a surface shape of the specular surface acquired from the positional deviation amount, wherein a center of the illuminator and a center of the imaging device are arranged on a normal to the specular surface.

9. The surface shape measuring apparatus as claimed in claim 8, wherein the pattern included in the first light pattern is a dot pattern.

10. The surface shape measuring apparatus as claimed in claim 8, further comprising:

a telecentric lens disposed between the illuminator and the imaging device, wherein the imaging device captures the image of the second light pattern reflected by the specular surface, transmitted through the illuminator, and further transmitted through the telecentric lens.

\*   \*   \*   \*   \*